United States Patent
Chiu et al.

(10) Patent No.: US 9,960,706 B1
(45) Date of Patent: May 1, 2018

(54) SYNCHRONIZATION RECTIFICATION DEVICE

(71) Applicant: MEAN WELL (GuangZhou) Electronics Co., Ltd., Guangzhou (CN)

(72) Inventors: Chih Hsiang Chiu, Guangzhou (CN); Ching-Min Chuang, Guangzhou (CN)

(73) Assignee: Mean Well (Guangzhou) Electronics Co., Ltd., Guangzhou (CN)

( * ) Notice: Subject to any disclaimer, the term of this patent is extended or adjusted under 35 U.S.C. 154(b) by 0 days. days.

(21) Appl. No.: 15/603,951

(22) Filed: May 24, 2017

(51) Int. Cl.
*H02M 1/34* (2007.01)
*H02M 7/217* (2006.01)
*H02M 3/335* (2006.01)

(52) U.S. Cl.
CPC ............. *H02M 7/217* (2013.01); *H02M 1/34* (2013.01); *H02M 3/33592* (2013.01); *H02M 3/33576* (2013.01)

(58) Field of Classification Search
CPC . H02M 2001/0003; H02M 2001/0048; H02M 1/34; H02M 3/335; H02M 3/33576; H02M 3/33592; H02M 3/337; H02M 7/217; H02M 7/155
See application file for complete search history.

(56) References Cited

U.S. PATENT DOCUMENTS

| | | | | |
|---|---|---|---|---|
| 6,882,548 B1* | 4/2005 | Jacobs | ..................... | H02M 1/34 363/127 |
| 2004/0174721 A1* | 9/2004 | Yamamoto | .............. | H02M 1/36 363/19 |
| 2009/0290391 A1* | 11/2009 | Toccaceli | .......... | H02M 3/33592 363/21.14 |
| 2011/0194206 A1* | 8/2011 | Sase | .................. | H02M 3/33592 360/75 |
| 2016/0072399 A1* | 3/2016 | Kikuchi | ............ | H02M 3/33592 363/21.14 |
| 2016/0105122 A1* | 4/2016 | Gong | ................ | H02M 3/33592 363/21.14 |
| 2016/0294298 A1* | 10/2016 | Wong | ................ | H02M 3/33592 |
| 2017/0207715 A1* | 7/2017 | Lin | ................... | H02M 3/33592 |

* cited by examiner

*Primary Examiner* — Emily P Pham
*Assistant Examiner* — Shahzeb K Ahmad
(74) *Attorney, Agent, or Firm* — Muncy, Geissler, Olds & Lowe, P.C.

(57) ABSTRACT

A synchronization rectification device is connected with a secondary side of a transformer of a power supply and an output capacitor. The synchronization rectification device includes a rectification switch, a voltage-controlled switch module and a rectification controller. The rectification switch is connected between the secondary side and the output capacitor. The voltage-controlled switch module connected with the secondary side has a voltage-division capacitor and receives a secondary voltage generated by the secondary side. The rectification controller is connected with the rectification switch and the voltage-controlled switch module. When the secondary voltage rises to a switching voltage value below a first voltage value, the rectification controller controls the rectification switch to be turned off. After the rectification switch is turned off, the voltage-controlled switch module is turned off, and the voltage-division capacitor receives the secondary voltage.

12 Claims, 5 Drawing Sheets

SYNCHRONIZATION RECTIFICATION DEVICE

BACKGROUND OF THE INVENTION

Field of the Invention

The present invention relates to a synchronization rectification device, particularly to a synchronization rectification device applied to a power supply.

Description of the Related Art

In the market, a power supply can output a high voltage and a constant current. Since the required power of the power supply is low, the output current is low. Besides, a synchronization rectifier at a secondary side of a transformer is realized with a diode. When lamps are applied more widely, the required power is high as well. In such a case, the synchronization rectifier at the secondary side is still realized with a diode, which results in a great loss, low efficiency, low heat dissipation, short life of an output capacitor and short warranty period of the power supply.

Figure 1:
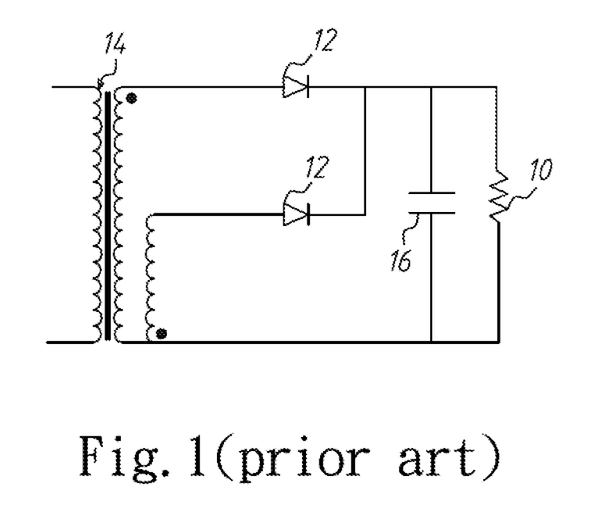
FIG. 1 is a diagram schematically showing a transformer, two diodes, an output capacitor and a load in a conventional technology.
Figure 2:
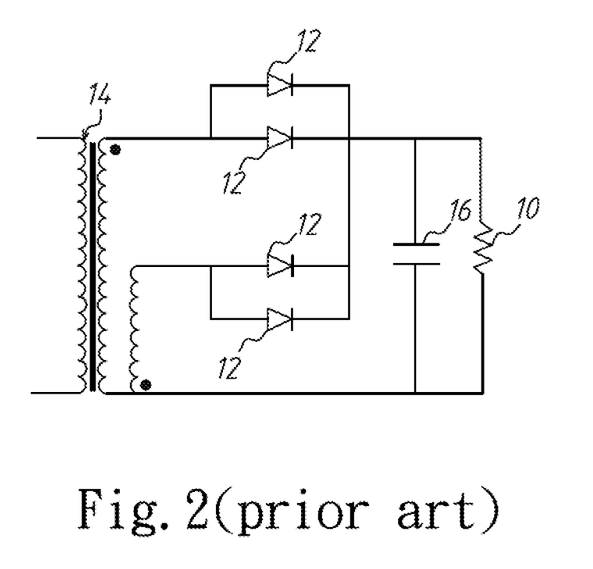
FIG. 2 is a diagram schematically showing a transformer, four diodes, an output capacitor and a load in a conventional technology.
Figure 3:
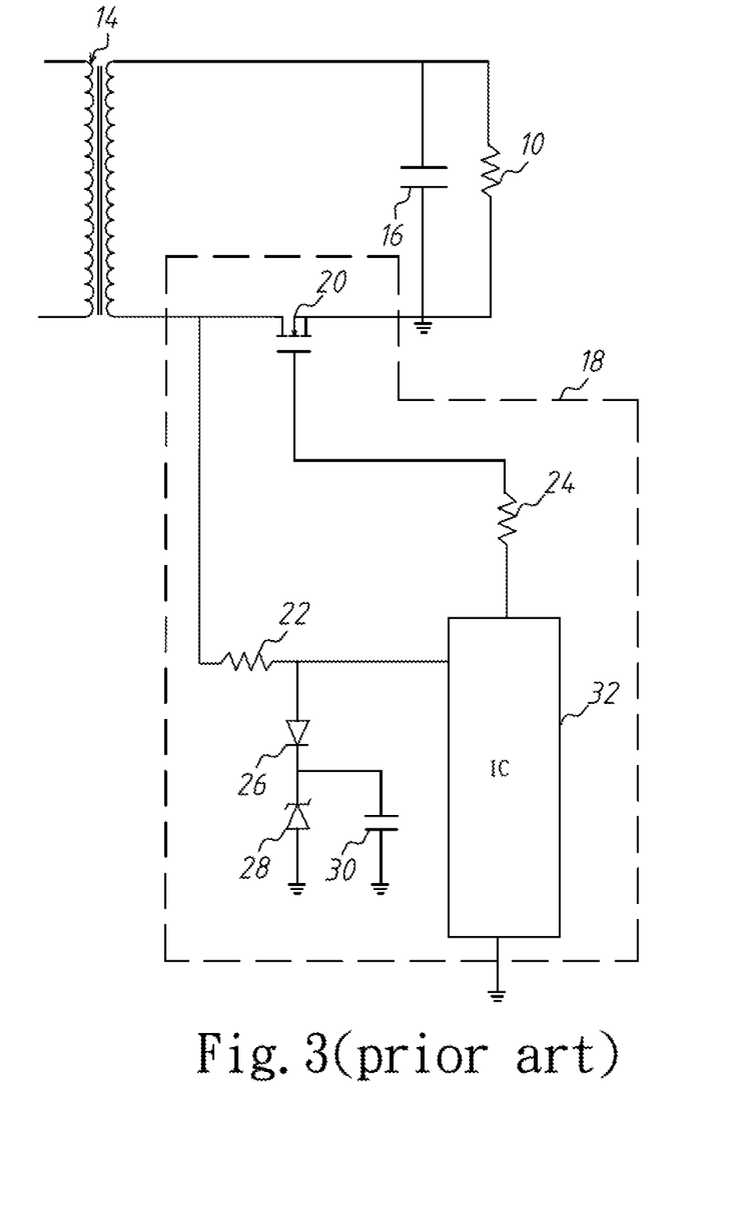
FIG. 3 is a diagram schematically showing a transformer and a synchronization rectification circuit in a conventional technology.

Refer to FIG. 1, which shows a load 10 and diodes 12, a secondary side of a transformer 14 and an output capacitor 16 of a power supply, wherein each diode 12 is used as a synchronization rectifier. However, the conduction loss of the diode 12 is too high and too much heat is produced. The diodes 12 connected in parallel form a synchronization rectifier to attempt to distribute the heat, as shown in FIG. 2. After turning on the diode 12, a conduction voltage of the diode 12 is not proportional to its conduction current. When the conduction current is higher, the conduction voltage slightly changes. As a result, the diodes 12 in FIG. 2 only dissipate heat but the output efficiency of the power supply cannot significantly increase. In addition, there is a problem with non-uniform current distribution. In order to reduce the conduction loss, the secondary side is connected with a synchronization rectification circuit 18, as shown in FIG. 3. The synchronization rectification circuit 18 includes an NMOSFET 20, a first resistor 22, a second resistor 24, a diode 26, a Zener diode 28, a capacitor 30 and an IC 32, wherein the NMOSFET 20 is directly connected with the secondary side. When the power supply outputs hundreds of voltages, the high voltage drop across the first resistor 22 can cause a great loss. If a value of the first resistor 22 increases, the IC 32 difficultly detects a drain voltage of the NMOSFET 20.

To overcome the abovementioned problems, the present invention provides a synchronization rectification device, so as to solve the afore-mentioned problems of the prior art.

SUMMARY OF THE INVENTION

A primary objective of the present invention is to provide a synchronization rectification device, which utilizes a voltage-controlled switch module having a voltage-division capacitor to detect a secondary voltage, thereby greatly improving the output efficiency and the capacitor reliability, reducing the loss, extending the warranty period of products and precisely achieving synchronization rectification.

To achieve the abovementioned objectives, the present invention provides a synchronization rectification device, which is connected with a secondary side of a transformer of a power supply and an output capacitor. The synchronization rectification device includes a rectification switch, a voltage-controlled switch module and a rectification controller. The rectification switch is connected between the secondary side and the output capacitor. The voltage-controlled switch module connected with the secondary side has a voltage-division capacitor, and receives a secondary voltage generated by the secondary side. The rectification controller is connected with the rectification switch and the voltage-controlled switch module. When the secondary voltage rises to a switching voltage value below a first voltage value, the rectification controller controls the rectification switch to be turned off. After the rectification switch is turned off, the voltage-controlled switch module is turned off, and the voltage-division capacitor receives the secondary voltage, and the secondary voltage continues rising until the first voltage value.

In an embodiment of the present invention, when the secondary voltage descends to a second voltage value below the switching voltage value, the voltage-controlled switch module is turned on, and the rectification controller detects the second voltage value through the voltage-controlled switch module, so as to turn on the rectification switch.

In an embodiment of the present invention, the voltage-controlled switch module is an N-channel metal field transistor (NMOSFET), and a drain of the NMOSFET is connected with the secondary side and the rectification switch to receive the secondary voltage, and a gate of the NMOSFET is connected with a direct-current (DC) voltage source to receive a direct-current (DC) voltage value of the DC voltage source, and the DC voltage value is less than or equal to the first voltage value, and the DC voltage value is larger than the second voltage value, and a source of the NMOSFET is connected with the rectification controller, and a parasitic source-drain capacitor of the NMOSFET is used as the voltage-division capacitor, and after the rectification switch is turned off, the NMOSFET is turned off, and when the secondary voltage is equal to the second voltage value, the NMOSFET is turned on, and the rectification controller detects the second voltage value.

In an embodiment of the present invention, the voltage-controlled switch module further comprises an auxiliary capacitor, an N-channel metal field transistor (NMOSFET) and a diode. A drain of N-channel metal field transistor (NMOSFET) is connected with the secondary side and the rectification switch to receive the secondary voltage, and a gate of the NMOSFET is connected with a direct-current (DC) voltage source to receive a direct-current (DC) voltage value of the DC voltage source, and the DC voltage value is less than or equal to the first voltage value, and the DC voltage value is larger than the second voltage value, and a source of the NMOSFET is connected with the rectification controller, and the auxiliary capacitor is connected between the source and the drain, and a parasitic source-drain capacitor of the NMOSFET and the auxiliary capacitor form the voltage-division capacitor, and after the rectification switch is turned off, the NMOSFET is turned off. An anode of the diode is connected with the source, and a cathode of the diode is connected with the drain, and when the secondary voltage is equal to the second voltage value, the NMOSFET is turned on, and the rectification controller detects the second voltage value.

In an embodiment of the present invention, the voltage-controlled switch module further comprises an NPN bipolar junction transistor (BJT) and a diode. An emitter of the NPN BJT is connected with the secondary side and the rectification switch to receive the secondary voltage, and a base of the NPN BJT is connected with a direct-current (DC) voltage source to receive a direct-current (DC) voltage value of the DC voltage source, and the DC voltage value is less than or equal to the first voltage value, and the DC voltage value is larger than the second voltage value, and the voltage-division capacitor is connected between the emitter and a collector of the NPN BJT, and the collector is connected with the rectification controller, and after the rectification switch is turned off, the NPN BJT is turned off. An anode of the diode is connected with the emitter, and a cathode of the diode is connected with the collector, and when the secondary voltage is equal to the second voltage value, the NPN BJT is turned on, and the rectification controller detects the second voltage value.

In an embodiment of the present invention, the DC voltage source is an auxiliary power of the power supply.

In an embodiment of the present invention, the synchronization rectification device further comprises a transient voltage suppressor (TVS) with one end thereof connected with the rectification controller and the voltage-controlled switch module and another end thereof grounded, and the TVS stabilizes a voltage detected by the rectification controller.

In an embodiment of the present invention, the synchronization rectification device further comprises a Zener diode with one end thereof connected with the rectification controller and the voltage-controlled switch module and another end thereof grounded, and the Zener diode stabilizes a voltage detected by the rectification controller.

In an embodiment of the present invention, the rectification switch is an N-channel metal field transistor (NMOSFET) or a P-channel metal field transistor (PMOSFET).

In an embodiment of the present invention, the synchronization rectification device further comprises a first resistor and a second resistor. The first resistor is connected between the rectification controller and the rectification switch. The second resistor is connected between the rectification controller and the voltage-controlled switch module, and the rectification controller detects the second voltage value through the second resistor.

Below, the embodiments are described in detail in cooperation with the drawings to make easily understood the technical contents, characteristics and accomplishments of the present invention.

DETAILED DESCRIPTION OF THE INVENTION

Reference will now be made in detail to embodiments illustrated in the accompanying drawings. Wherever possible, the same reference numbers are used in the drawings and the description to refer to the same or like parts. In the drawings, the shape and thickness may be exaggerated for clarity and convenience. This description will be directed in particular to elements forming part of, or cooperating more directly with, methods and apparatus in accordance with the present disclosure. It is to be understood that elements not specifically shown or described may take various forms well known to those skilled in the art. Many alternatives and modifications will be apparent to those skilled in the art, once informed by the present disclosure.

Figure 4:
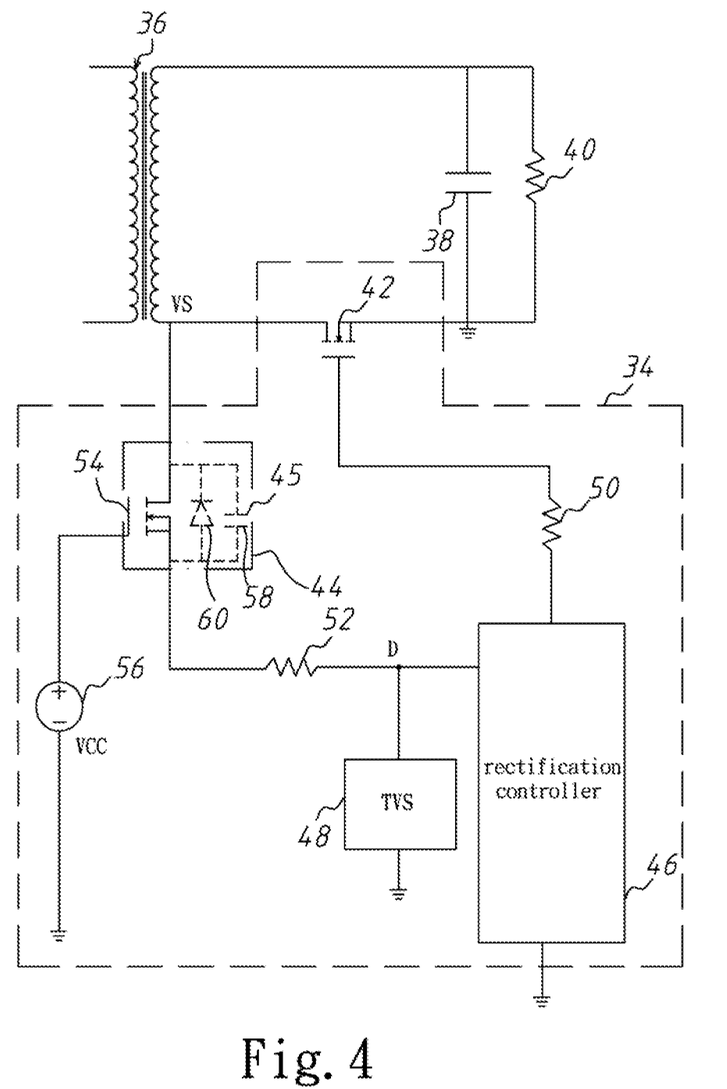
FIG. 4 is a diagram schematically showing a synchronization rectification device according to the first embodiment of the present invention.

Refer to FIG. 4. The first embodiment of the synchronization rectification device 34 of the present invention is introduced as below. The synchronization rectification device 34 is connected with a secondary side of a transformer 36 of a power supply and an output capacitor 38. The output capacitor 38 and a load 40 are connected in parallel. One terminal of the output capacitor 38 is connected with the secondary side, and the other terminal of the output capacitor 38 is grounded. The power supply is a forward power supply, a flyback power supply or a resonant power supply, but the present invention is not limited thereto. The power supply has a main power and an auxiliary power. A voltage of the auxiliary power is less than a voltage of the main power. The synchronization rectification device 34 comprises a rectification switch 42, a voltage-controlled switch module 44, a rectification controller 46, a transient voltage suppressor (TVS) 48, a first resistor 50 and a second resistor 52. For example, the TVS 48 is a Zener diode or a diode-string. The rectification switch 42 is an N-channel metal field transistor (NMOSFET) or a P-channel metal field transistor (PMOSFET). In the first embodiment, the TVS 48 is exemplified by a Zener diode, and the rectification switch 42 is exemplified by an NMOSFET. The rectification switch 42 is connected between the secondary side and the output capacitor 38. The voltage-controlled switch module 44 has a voltage-division capacitor 45. The voltage-controlled switch module 44 is connected with the secondary side to receive a secondary voltage VS generated by the secondary side. The rectification controller 46 is connected with the rectification switch 42 and the voltage-controlled switch module 44. When the secondary voltage VS rises to a switching voltage value below a first voltage value, the rectification controller 46 controls the rectification switch 42 to be turned off. After the rectification switch 42 is turned off, the voltage-controlled switch module 44 is turned off, and the voltage-division capacitor 45 receives the secondary voltage VS, and the secondary voltage VS continues rising until the first voltage value. A capacitance value of the voltage-division capacitor 45 is adjusted according to requirement. In principle, the voltage-division capacitor 45 has to support the first voltage value. The first voltage value is the maximum value of the secondary voltage VS. When the secondary voltage VS descends to a second voltage value below the switching voltage value, the voltage-controlled switch module 44 is turned on, and the rectification controller 46 detects the second voltage value through the voltage-controlled switch module 44, so as to turn on the rectification switch 42. One end of the TVS 48 is connected with the rectification controller 46 and the voltage-controlled switch module 44 and the other end of the TVS 48 is grounded, and the TVS 48 stabilizes a voltage detected by the rectification controller 46. Thus, the first voltage value is larger than the clamping voltage of the TVS 48. The first resistor 50 is connected between the rectification controller 46 and the rectification switch 42. The second resistor 52 is connected between the rectification controller 46 and the voltage-controlled switch module 44, and the rectification controller 46 detects the second voltage value through the second resistor 52.

The voltage-controlled switch module 44 is an N-channel metal field transistor (NMOSFET) 54, and a drain of the NMOSFET 54 is connected with the secondary side and the rectification switch 42 to receive the secondary voltage VS, and a gate of the NMOSFET 54 is connected with a direct-current (DC) voltage source 56 to receive a direct-current (DC) voltage value VCC of the DC voltage source 56, and the DC voltage value VCC is less than or equal to the first voltage value, and the DC voltage value VCC is larger than the second voltage value, and the DC voltage source 56 is the auxiliary power of the power supply, and the DC voltage value VCC is provided by the auxiliary power of the power supply. When the auxiliary power does not provide the DC voltage value VCC, the synchronization rectification device 34 does not operate. On top of that, a user can change the voltage of the auxiliary power according to requirement. In this way, when the secondary voltage VS has a voltage range, the secondary voltage VS can turn on the NMOSFET 54. A source and a body of the NMOSFET 54 are connected to each other. The source of the NMOSFET 54 is connected with the rectification controller 46 and the TVS 48 through the second resistor 52. A parasitic source-drain capacitor 58 of the NMOSFET 54 is used as the voltage-division capacitor 45. After the rectification switch 42 is turned off, the NMOSFET 54 is turned off. When the secondary voltage VS is equal to the second voltage value, the NMOSFET 54 is turned on, and the rectification controller 46 detects the second voltage value.

The operation of the first embodiment of the synchronization rectification device of the present invention is introduced as below. When the secondary voltage VS descends to the second voltage value, the parasitic source-drain capacitor 58 and a node D discharge to generate a current to pass through a parasitic drain-body diode 60. Since the DC voltage value VCC is larger than the second voltage value, the NMOSFET 54 is turned on. When no current passes through the parasitic drain-body diode 60, a voltage of the node D is equal to the second voltage value. In other words, the rectification controller 46 directly receives the second voltage value to turn on the rectification switch 42. When the secondary voltage VS rises to the switching voltage value, the NMOSFET 54 is turned on due to a voltage difference between the switching voltage value and the DC voltage value VCC. Meanwhile, the rectification controller 46 controls the rectification switch 42 to be turned off according to the switching voltage value. When the secondary voltage VS continues rising to the first voltage value, the NMOSFET 54 is turned off since the DC voltage value VCC is less than or equal to the first voltage value. Meanwhile, the secondary voltage VS charges the parasitic source-drain capacitor 58, so that the voltage of the node D is equal to the clamping voltage of the TVS 48. As a result, the rectification controller 46 receives the first voltage value through the parasitic source-drain capacitor 58 to turn off the rectification switch 42. Since the conduction resistance of the NMOSFET 54 is lower than that of a diode, the NMOSFET 54 can reduce the conduction loss. In addition, since the rectification controller 46 receives the first voltage value through the parasitic source-drain capacitor 58, the rectification controller 46 is prevented from damage caused by the secondary voltage VS, thereby greatly improving the output efficiency and the capacitor reliability, extending the warranty period of products and precisely achieving synchronization rectification.

Even if at least one of the TVS 48, the first resistor 50 and the second resistor 52 is omitted, the abovementioned purpose is also achieved.

Figure 5:
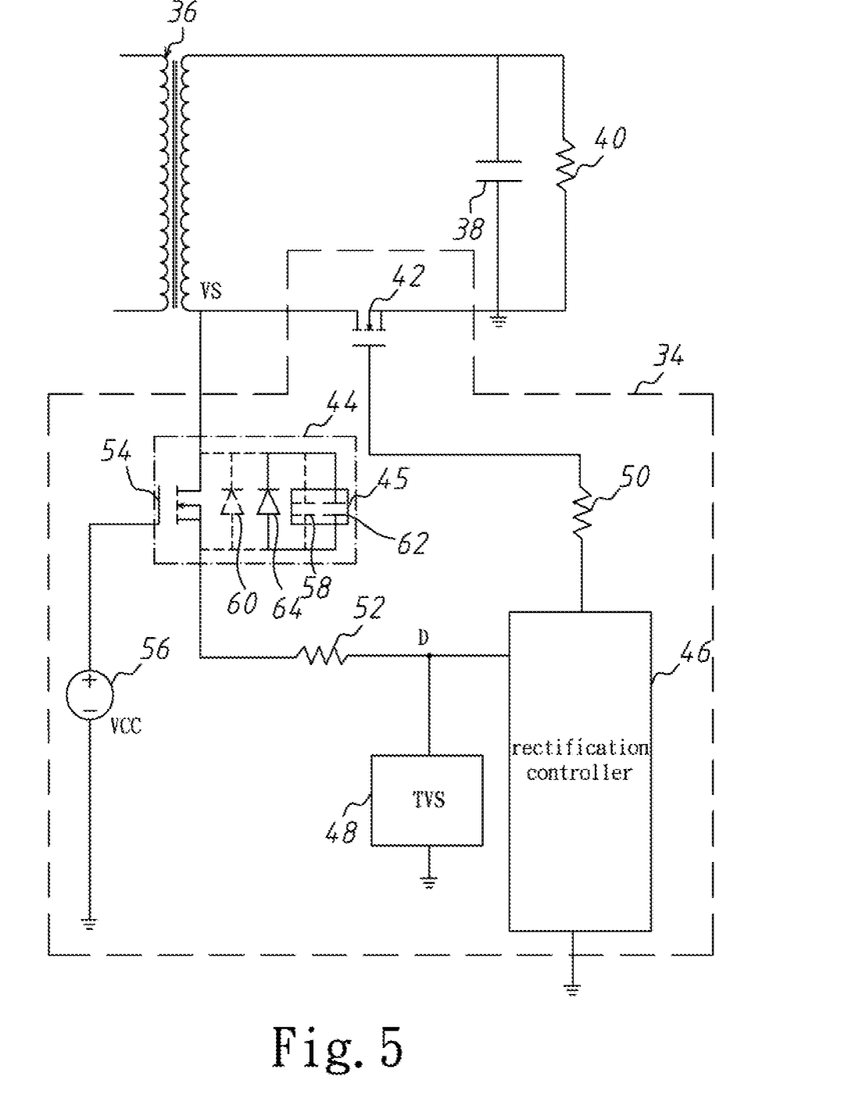
FIG. 5 is a diagram schematically showing a synchronization rectification device according to the second embodiment of the present invention.

The second embodiment of the synchronization rectification device of the present invention is introduced as below. As shown in FIG. 5, the first embodiment is different from the second embodiment in the voltage-controlled switch module 44. The voltage-controlled switch module 44 further comprises an auxiliary capacitor 62, an N-channel metal field transistor (NMOSFET) 54 and a diode 64. A drain of the NMOSFET 54 is connected with the secondary side and the rectification switch 42 to receive the secondary voltage VS, and a gate of the NMOSFET 54 is connected with a direct-current (DC) voltage source 56 to receive a direct-current (DC) voltage value VCC of the DC voltage source 56, and the DC voltage value VCC is less than or equal to the first voltage value, and the DC voltage value VCC is larger than the second voltage value, and the DC voltage source 56 is the auxiliary power of the power supply, and the DC voltage value VCC is provided by the auxiliary power of the power supply. When the auxiliary power does not provide the DC voltage value VCC, the synchronization rectification device 34 does not operate. On top of that, a user can change the voltage of the auxiliary power according to requirement. In this way, when the secondary voltage VS has a voltage range, the secondary voltage VS can turn on the NMOSFET 54. A source and a body of the NMOSFET 54 are connected to each other. The source of the NMOSFET 54 is connected with the rectification controller 46 and the TVS 48 through the second resistor 52. The auxiliary capacitor 62 is connected between the source and the drain. A parasitic source-drain capacitor 58 of the NMOSFET 54 and the auxiliary capacitor 62 form the voltage-division capacitor 45. After the rectification switch 42 is turned off, the NMOSFET 54 is turned off. When the secondary voltage VS is equal to the second voltage value, the NMOSFET 54 is turned on, and the rectification controller 46 detects the second voltage value.

The operation of the second embodiment of the synchronization rectification device of the present invention is introduced as below. When the secondary voltage VS descends to the second voltage value, the parasitic source-drain capacitor 58, the auxiliary capacitor 62 and a node D discharge to generate a current to pass through a parasitic drain-body diode 60 and the diode 64. Since the DC voltage value VCC is larger than the second voltage value, the NMOSFET 54 is turned on. When no current passes through the parasitic drain-body diode 60 and the diode 64, a voltage of the node D is equal to the second voltage value. In other words, the rectification controller 46 directly receives the second voltage value to turn on the rectification switch 42. When the secondary voltage VS rises to the switching voltage value, the NMOSFET 54 is turned on due to a voltage difference between the switching voltage value and the DC voltage value VCC. Meanwhile, the rectification controller 46 controls the rectification switch 42 to be turned off according to the switching voltage value. When the secondary voltage VS continues rising to the first voltage value, the NMOSFET 54 is turned off since the DC voltage value VCC is less than or equal to the first voltage value. Meanwhile, the secondary voltage VS charges the parasitic source-drain capacitor 58 and the auxiliary capacitor 62, so that the voltage of the node D is equal to the clamping voltage of the TVS 48. As a result, the rectification controller 46 receives the first voltage value through the parasitic source-drain capacitor 58 and the auxiliary capacitor 62 to turn off the rectification switch 42. Since the conduction resistance of the NMOSFET 54 is lower than that of a diode, the NMOSFET 54 can reduce the conduction loss. In addition, since the rectification controller 46 receives the first voltage value through the parasitic source-drain capacitor 58 and the auxiliary capacitor 62, the rectification controller 46 is prevented from damage caused by the secondary voltage VS, thereby greatly improving the output efficiency and the capacitor reliability, extending the warranty period of products and precisely achieving synchronization rectification.

Figure 6:
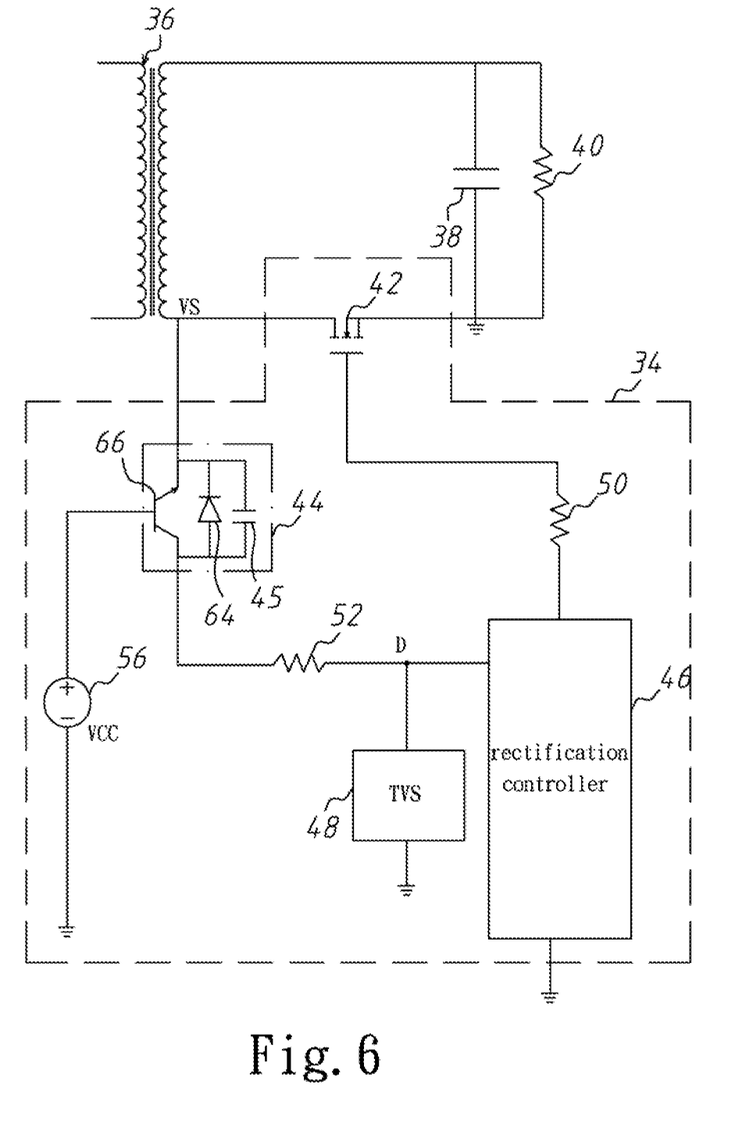
FIG. 6 is a diagram schematically showing a synchronization rectification device according to the third embodiment of the present invention.

The third embodiment of the synchronization rectification device of the present invention is introduced as below. As shown in FIG. 6, the voltage-controlled switch module 44 further comprises a NPN bipolar junction transistor (BJT) 66 and a diode 64, and an emitter of the NPN BJT 66 is connected with the secondary side and the rectification switch 42 to receive the secondary voltage VS, and a base of the NPN BJT 66 is connected with a direct-current (DC) voltage source 56 to receive a direct-current (DC) voltage value VCC of the DC voltage source 56, and the DC voltage value VCC is less than or equal to the first voltage value, and the DC voltage value VCC is larger than the second voltage value, and the DC voltage source 56 is the auxiliary power of the power supply, and the DC voltage value VCC is provided by the auxiliary power of the power supply. When the auxiliary power does not provide the DC voltage value VCC, the synchronization rectification device 34 does not operate. On top of that, a user can change the voltage of the auxiliary power according to requirement. In this way, when the secondary voltage VS has a voltage range, the secondary voltage VS can turn on the NPN BJT 66. The voltage-division capacitor 45 is connected between the emitter and a collector of the NPN BJT 66. The collector of the NPN BJT 66 is connected with the rectification controller 46 and the TVS 48 through the second resistor 52. After the rectification switch 42 is turned off, the NPN BJT 66 is turned off. An anode of the diode 64 is connected with the emitter, and a cathode of the diode 64 is connected with the collector. When the secondary voltage VS is equal to the second voltage value, the NPN BJT 66 is turned on, and the rectification controller 46 detects the second voltage value.

The operation of the third embodiment of the synchronization rectification device of the present invention is introduced as below. When the secondary voltage VS descends to the second voltage value, the voltage-division capacitor 45 and a node D discharge to generate a current to pass through the diode 64. Since the DC voltage value VCC is larger than the second voltage value, the NPN BJT 66 is turned on. When no current passes through the diode 64, a voltage of the node D is equal to the second voltage value. In other words, the rectification controller 46 directly receives the second voltage value to turn on the rectification switch 42. When the secondary voltage VS rises to the switching voltage value, the NPN BJT 66 is turned on due to a voltage difference between the switching voltage value and the DC voltage value VCC. Meanwhile, the rectification controller 46 controls the rectification switch 42 to be turned off according to the switching voltage value. When the secondary voltage VS continues rising to the first voltage value, the NMOSFET 54 is turned off since the DC voltage value VCC is less than or equal to the first voltage value. Meanwhile, the secondary voltage VS charges the voltage-division capacitor 45, so that the voltage of the node D is equal to the clamping voltage of the TVS 48. As a result, the rectification controller 46 receives the first voltage value through the voltage-division capacitor 45 to turn off the rectification switch 42. Since the conduction resistance of the NPN BJT 66 is lower than that of a diode, the NPN BJT 66 can reduce the conduction loss. In addition, since the rectification controller 46 receives the first voltage value through the voltage-division capacitor 45, the rectification controller 46 is prevented from damage caused by the secondary voltage VS, thereby greatly improving the output efficiency and the capacitor reliability, extending the warranty period of products and precisely achieving synchronization rectification.

Additionally, the voltage-controlled switch module 44 alternatively consists of a PMOSFET or a PNP BJT. In such a case, the operation of the voltage-controlled switch module 44 is similar to those of the abovementioned embodiments so will not be reiterated.

In conclusion, the present invention utilizes the voltage-controlled switch module having the voltage-division capacitor to detect the secondary voltage and switches the rectification switch according to the secondary voltage, thereby greatly improving the output efficiency and the capacitor reliability, reducing the loss, extending the warranty period of products and precisely achieving synchronization rectification.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A synchronization rectification device connected with a secondary side of a transformer of a power supply and an output capacitor, and said synchronization rectification device comprises:
   a rectification switch connected between said secondary side and said output capacitor;
   a voltage-controlled switch module connected with said secondary side, having a voltage-division capacitor, and receiving a secondary voltage generated by said secondary side; and
   a rectification controller connected with said rectification switch and said voltage-controlled switch module, and when said secondary voltage rises to a switching voltage value below a first voltage value, said rectification controller controls said rectification switch to be turned off, and after said rectification switch is turned off, said voltage-controlled switch module is turned off, and said voltage-division capacitor receives said secondary voltage, and said secondary voltage continues rising until said first voltage value.

2. The synchronization rectification device according to claim 1, wherein when said secondary voltage descends to a second voltage value below said switching voltage value, said voltage-controlled switch module is turned on, and said rectification controller detects said second voltage value through said voltage-controlled switch module, so as to turn on said rectification switch.

3. The synchronization rectification device according to claim 2, wherein said voltage-controlled switch module is an N-channel metal field transistor (NMOSFET), and a drain of said NMOSFET is connected with said secondary side and said rectification switch to receive said secondary voltage, and a gate of said NMOSFET is connected with a direct-current (DC) voltage source to receive a direct-current (DC) voltage value of said DC voltage source, and said DC voltage value is less than or equal to said first voltage value, and said DC voltage value is larger than said second voltage value, and a source of said NMOSFET is connected with said rectification controller, and a parasitic source-drain capacitor of said NMOSFET is used as said voltage-division capacitor, and after said rectification switch is turned off, said NMOSFET is turned off, and when said secondary voltage is equal to said second voltage value, said NMOSFET is turned on, and said rectification controller detects said second voltage value.

4. The synchronization rectification device according to claim 3, wherein said DC voltage source is an auxiliary power of said power supply.

5. The synchronization rectification device according to claim 2, wherein said voltage-controlled switch module further comprises:
   an auxiliary capacitor;
   an N-channel metal field transistor (NMOSFET) with a drain thereof connected with said secondary side and said rectification switch to receive said secondary voltage, and a gate of said NMOSFET is connected with a direct-current (DC) voltage source to receive a direct-current (DC) voltage value of said DC voltage source, and said DC voltage value is less than or equal to said first voltage value, and said DC voltage value is larger than said second voltage value, and a source of said NMOSFET is connected with said rectification controller, and said auxiliary capacitor is connected between said source and said drain, and a parasitic source-drain capacitor of said NMOSFET and said auxiliary capacitor form said voltage-division capacitor, and after said rectification switch is turned off, said NMOSFET is turned off; and
   a diode with an anode thereof connected with said source, and a cathode of said diode is connected with said drain, and when said secondary voltage is equal to said second voltage value, said NMOSFET is turned on, and said rectification controller detects said second voltage value.

6. The synchronization rectification device according to claim 5, wherein said DC voltage source is an auxiliary power of said power supply.

7. The synchronization rectification device according to claim 2, wherein said voltage-controlled switch module further comprises:
   an NPN bipolar junction transistor (BJT) with an emitter thereof connected with said secondary side and said rectification switch to receive said secondary voltage, and a base of said NPN BJT is connected with a direct-current (DC) voltage source to receive a direct-current (DC) voltage value of said DC voltage source, and said DC voltage value is less than or equal to said first voltage value, and said DC voltage value is larger than said second voltage value, and said voltage-division capacitor is connected between said emitter and a collector of said NPN BJT, and said collector is connected with said rectification controller, and after said rectification switch is turned off, said NPN BJT is turned off; and
   a diode with an anode thereof connected with said emitter, and a cathode of said diode is connected with said collector, and when said secondary voltage is equal to said second voltage value, said NPN BJT is turned on, and said rectification controller detects said second voltage value.

8. The synchronization rectification device according to claim 7, wherein said DC voltage source is an auxiliary power of said power supply.

9. The synchronization rectification device according to claim 1, further comprising a transient voltage suppressor (TVS) with one end thereof connected with said rectification controller and said voltage-controlled switch module and another end thereof grounded, and said TVS stabilizes a voltage detected by said rectification controller.

10. The synchronization rectification device according to claim 1, comprising a Zener diode with one end thereof connected with said rectification controller and said voltage-controlled switch module and another end thereof grounded, and said Zener diode stabilizes a voltage detected by said rectification controller.

11. The synchronization rectification device according to claim 1, wherein said rectification switch is an N-channel metal field transistor (NMOSFET) or a P-channel metal field transistor (PMOSFET).

12. The synchronization rectification device according to claim 1, further comprising:
   a first resistor connected between said rectification controller and said rectification switch; and
   a second resistor connected between said rectification controller and said voltage-controlled switch module, and said rectification controller detects said second voltage value through said second resistor.

* * * * *